United States Patent
Sorias (10) Patent No.: US 11,146,086 B2
(45) Date of Patent: Oct. 12, 2021

(54) SMART LED POWER CABLE

(71) Applicant: Business Class Tech Inc., Lawrence, NY (US)

(72) Inventor: Yeoshua Sorias, Brooklyn, NY (US)

(73) Assignee: BUSINESS CLASS TECH INC., Lawrence, NY (US)

( * ) Notice: Subject to any disclaimer, the term of this patent is extended or adjusted under 35 U.S.C. 154(b) by 72 days.

(21) Appl. No.: 16/822,605

(22) Filed: Mar. 18, 2020

(65) Prior Publication Data

US 2020/0303935 A1 Sep. 24, 2020

Related U.S. Application Data (60) Provisional application No. 62/820,084, filed on Mar. 18, 2019.

(51) Int. Cl.
| | | |
|---|---|---|
| *H02J 7/00* | (2006.01) | |
| *F21V 33/00* | (2006.01) | |
| *H05B 45/10* | (2020.01) | |
| *F21Y 115/10* | (2016.01) | |

(52) U.S. Cl.
CPC ............ *H02J 7/0048* (2020.01); *F21V 33/00* (2013.01); *H02J 7/0042* (2013.01); *F21Y 2115/10* (2016.08); *H05B 45/10* (2020.01)

(58) Field of Classification Search
CPC .... H05B 47/105; H05B 47/165; H05B 45/20; H05B 45/10; H02J 7/0048; H02J 7/0042; H02J 7/0049; F21V 33/00; F21V 33/0052; F21Y 2107/30; F21Y 2115/10; Y02B 20/40
See application file for complete search history.

(56) References Cited

U.S. PATENT DOCUMENTS

| | | | |
|---|---|---|---|
| 7,952,487 B2 * | 5/2011 | Montebovi | H02J 7/0042 |
| | | | 340/636.1 |
| 2004/0037080 A1 * | 2/2004 | Luk | H05B 45/20 |
| | | | 362/249.12 |
| 2013/0193911 A1 * | 8/2013 | Miller | H02J 7/342 |
| | | | 320/107 |
| 2013/0201641 A1 * | 8/2013 | Soden | B60L 53/68 |
| | | | 361/752 |
| 2017/0321853 A1 * | 11/2017 | Chien | G03B 23/00 |

* cited by examiner

*Primary Examiner* — Bao Q Truong
(74) *Attorney, Agent, or Firm* — Ostrolenk Faber LLP (57) ABSTRACT

An electrical charging cable is configured to indicate the charge level of a battery being charged. The charging cable has a cable body with internal electrical conductors that are configured to carry charging current to the battery being charged. A plurality of LED lights are located at one location or over the length dimension of the cable and are configured to emit light that is indicative of the charging level of the battery being charged.

10 Claims, 9 Drawing Sheets

SMART LED POWER CABLE

CROSS-REFERENCE TO RELATED APPLICATION

The present non-provisional patent application claims the benefit of and priority to U.S. Provisional Patent Application No. 62/820,084, filed Mar. 18, 2019, by Yeoshua Sorias, and entitled "SMART LED POWER CABLE," the entire contents of which is incorporated herein by reference.

BACKGROUND OF THE INVENTION

The present invention is directed to a mobile device charging cable and, more particularly, to a charging cable that includes indicia that reflects the level of charge of the mobile device being charged, enabling distant viewing of the charging process at a glance.

In the prior art, the electrical charging cables are solid color and do not have any status indicator showing the phone's charging level status. In order for a user to know the charge level/status of the phone, he or she must view the device's charging icon (on the phone screen), which is a very small led light that is hard to see from a distance and also does not have charging level/status led color changing. It has a single color that turns into solid bar when the phone is fully charged.

In the present disclosure, the cable has or built-in charging status indicator that glows light colors to be able to check the charging status level from a distance, by looking at the color(s) in the glowing cable.

SUMMARY OF THE INVENTION

Accordingly, the present invention is directed to a charging cable that ameliorates drawbacks of the prior art, relating to tasks involving charging of mobile devices.

Other features and advantages of the present invention will become apparent from the following description of the charging cable according to the present disclosure, which refers to the accompanying drawings.

DETAILED DESCRIPTION OF THE DRAWINGS

FIG. 1 shows a cell phone, with the charging level indicating cable of the present invention attached. It may be a transparent/translucent cable with LED lights located along the length of the cable. The cable includes a logic indicator chip to control the LEDs on the cable, the logic chip being housed in the phone interface end. A USB type plug, or the like, is attached to the power block. The LED's may be one color or multi-colored. They may be grouped/clustered in 3's, can be red (to indicate no or low charge up to ⅓), yellow (partial charge ⅓-⅔), green (⅔ to full charge), or each LED can have 3 color states where the entire cord lights up in that color state.

The light level can progressively increase, as the charge level increases. A cluster may light up, and the overall color changes once each ⅓ is lit. Many possible lighting patterns and combinations are possible. Lights could be clustered in groups other than in 3's, and use more colors.

In FIG. 3B, the cable is ½ lit. The first third could be red, subsequent lights could be yellow. Or, all lights could light yellow, or just one light in each cluster lights yellow. In FIG. 3C, the cable is ¾ lit. The lighting patterns are many; first third red, second third yellow, remaining green. Or, all lights are green, or just one light in each cluster lights green. In FIG. 3D, the cable is fully lit, to indicate a fully charged state. The lighting patterns are many; first third red, second third yellow, remaining green. Or, all lights are green, or just one light in each cluster lights green.

Figure 1:
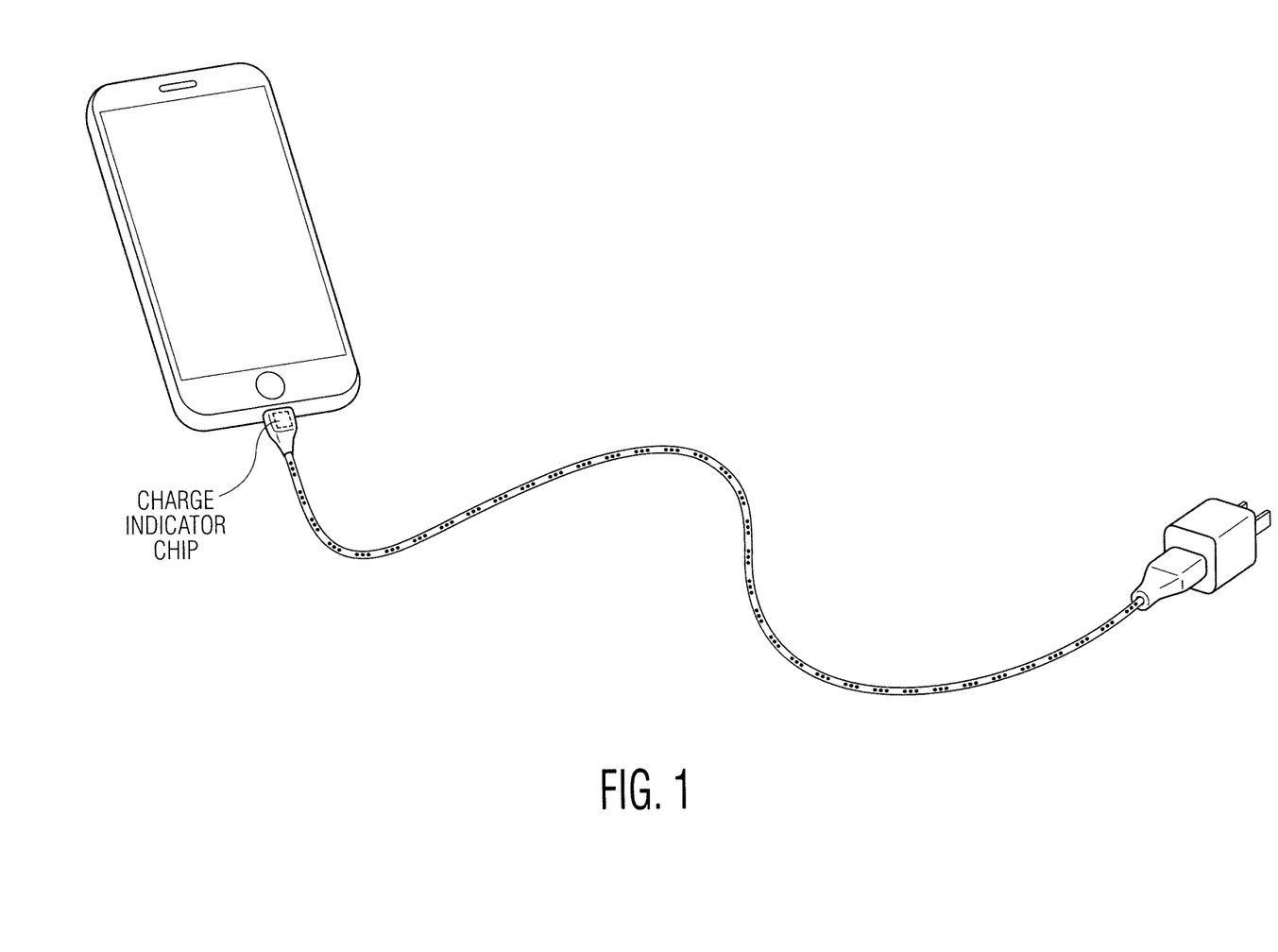
Figure 2:
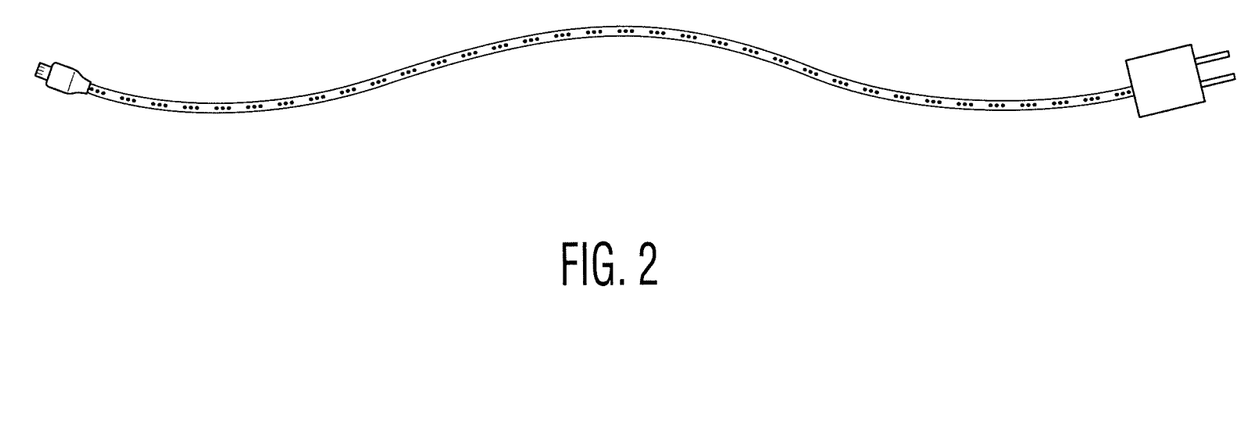
FIG. 2 shows the cable with a phone plug and no USB plug end, in a direct, plug to power form.
Figure 3A:
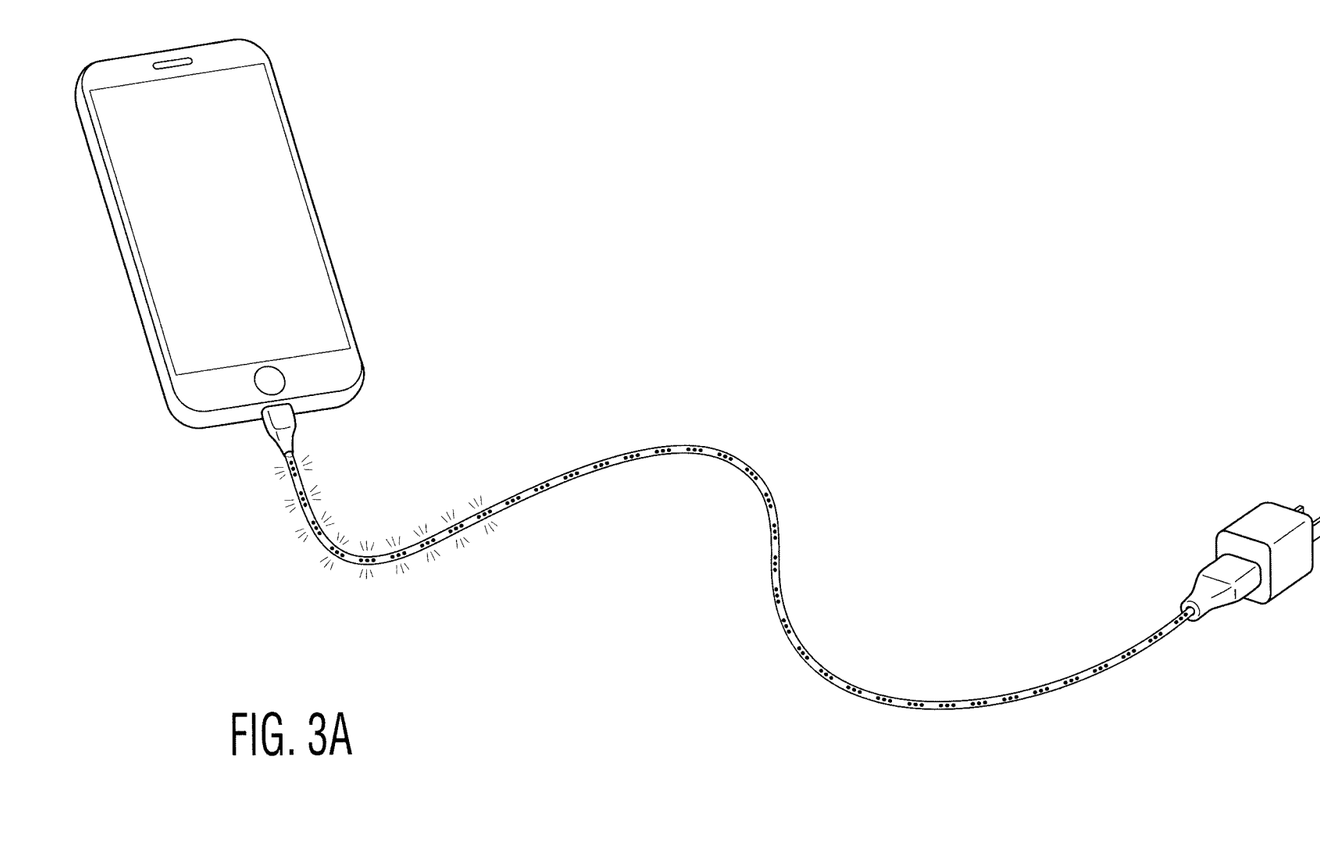
FIG. 3A shows the FIG. 1 embodiment, with LEDs partially lit—First ¼. Each cluster could be red, or just one light in the cluster lights up red.
Figure 3B:
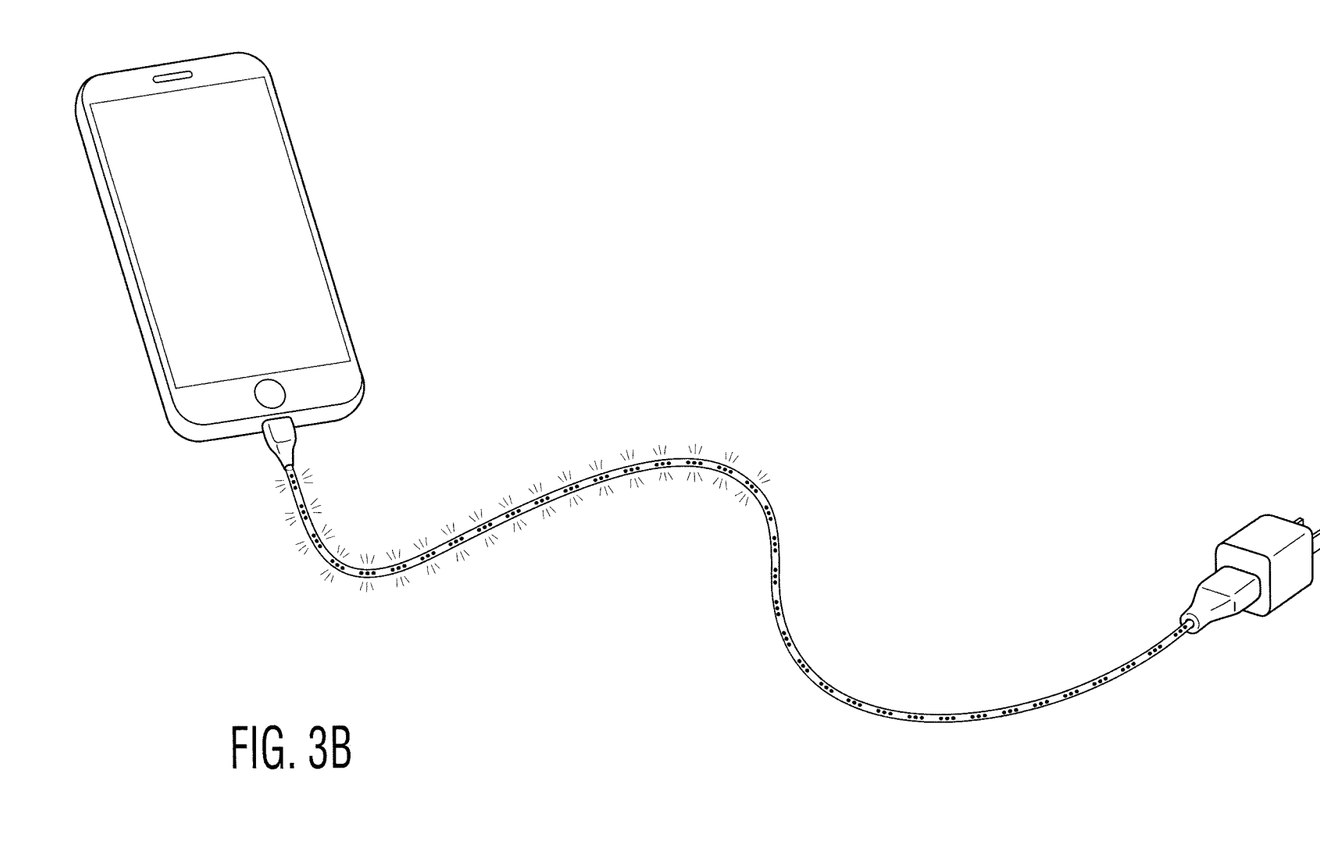
Figure 3C:
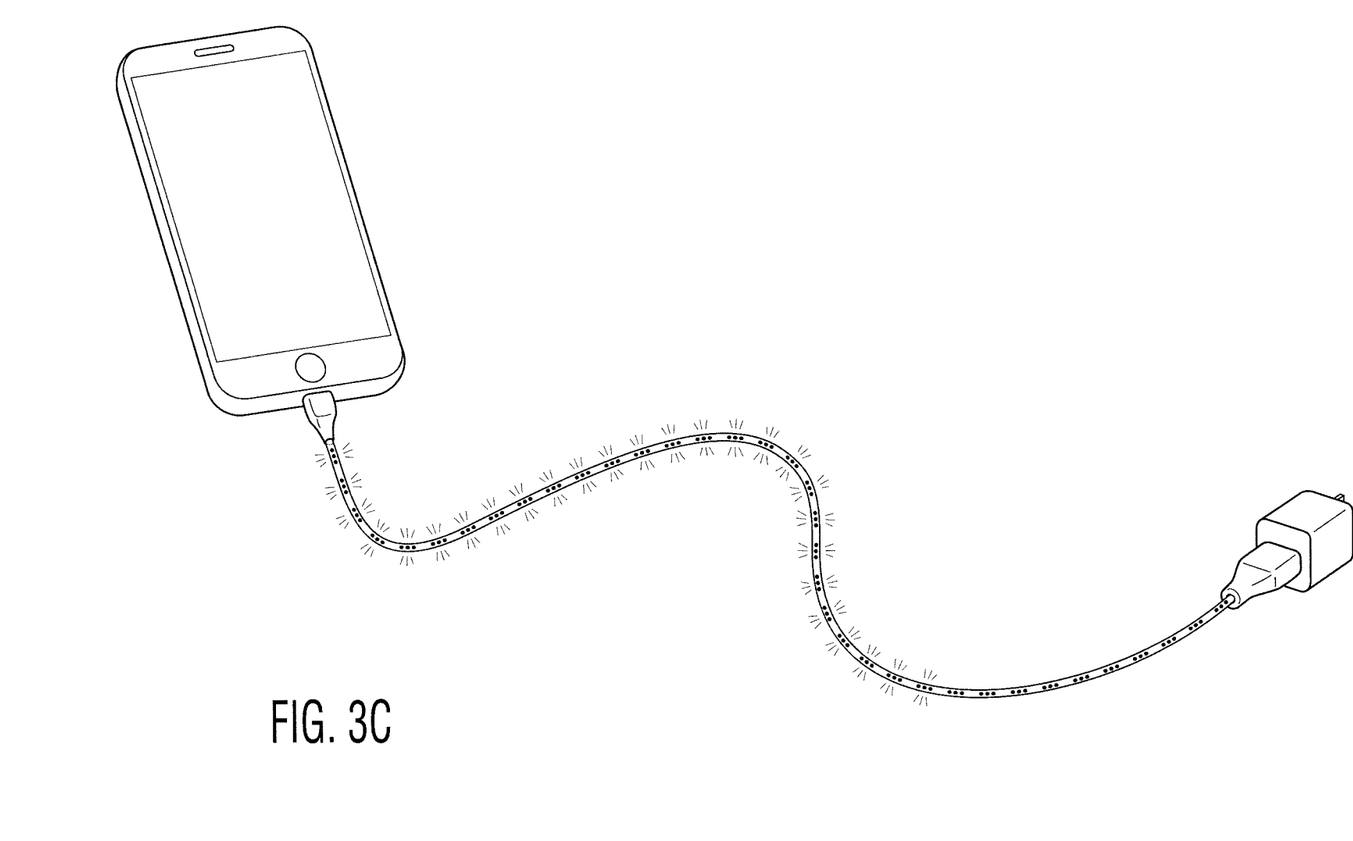
Figure 3D:
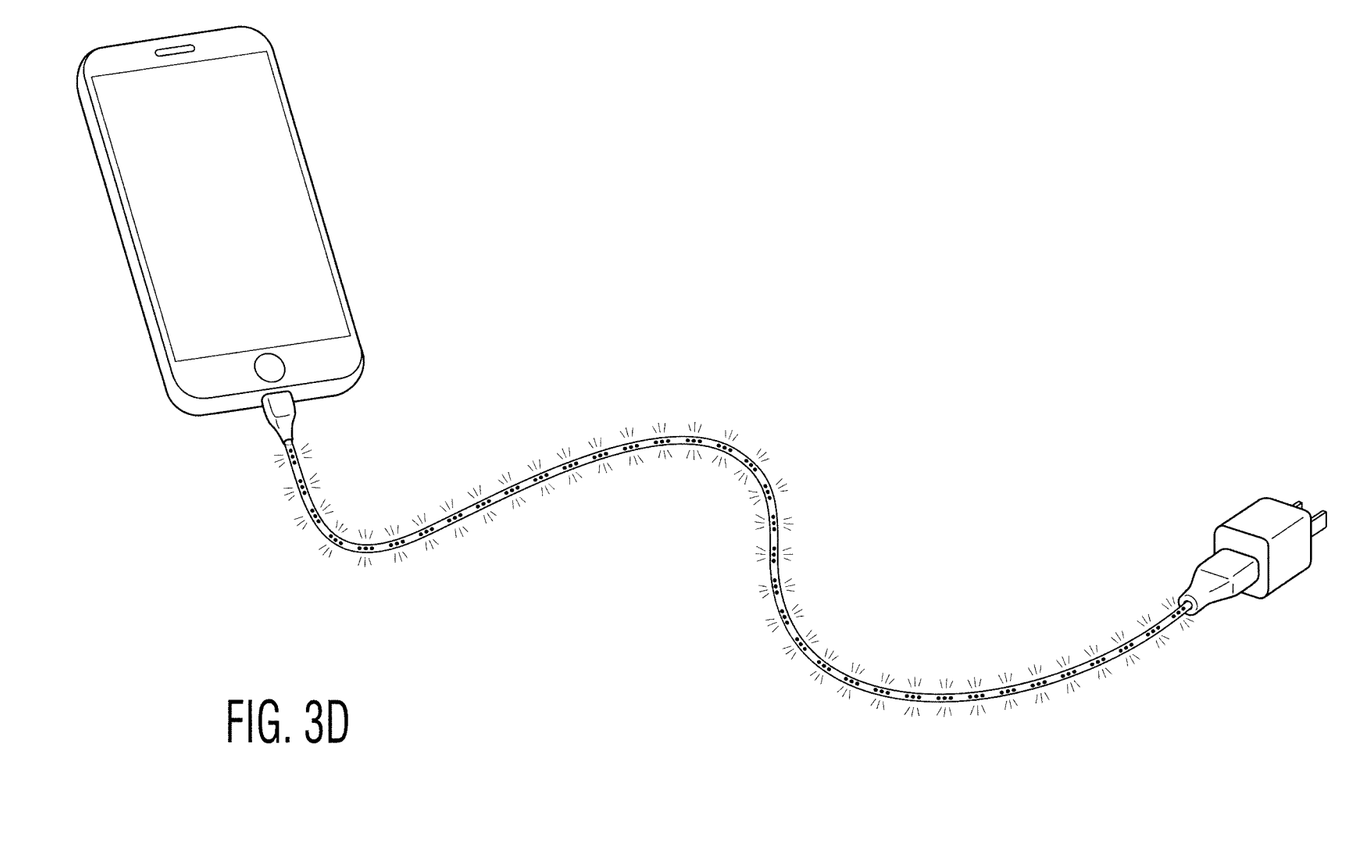
Figure 4:
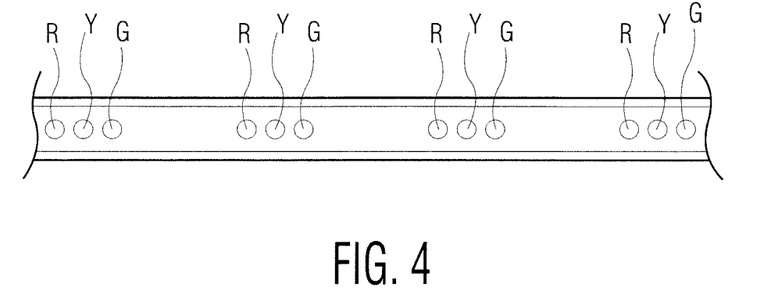
FIG. 4 shows another light cluster arrangement; where one is red, one yellow and one green in each cluster.
Figure 5:
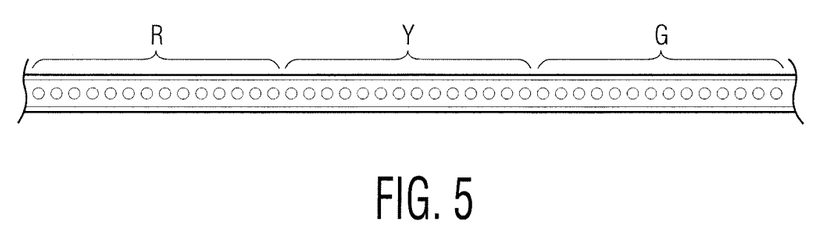
FIG. 5 shows another light cluster arrangement on an abbreviated cord. In the first third of the cable, all lights are red. In the second third all lights yellow. In the final third all lights green.
Figure 6A:
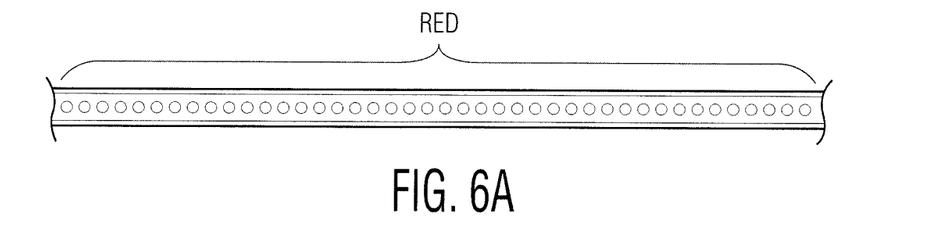
FIGS. 6A through 6C show another light configuration where each individual light is capable of displaying 3 different colors.
Figure 6B:
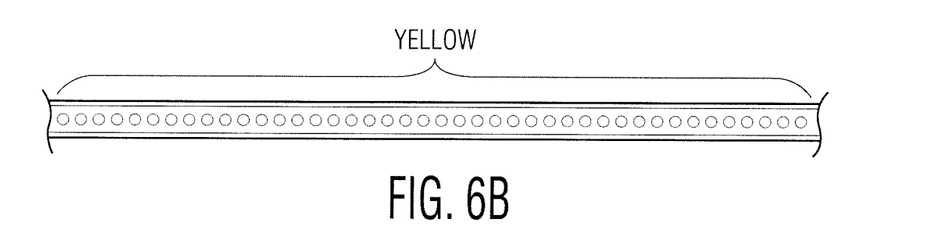
Figure 6C:
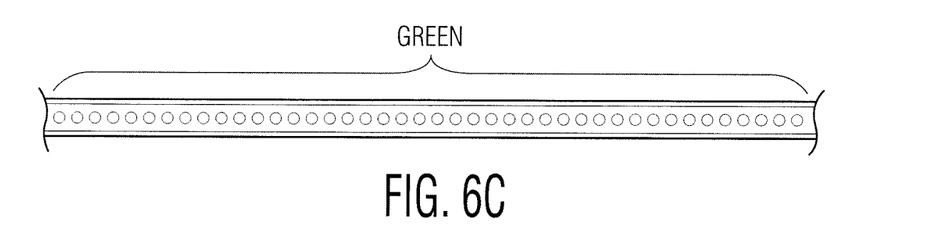
Figure 7:
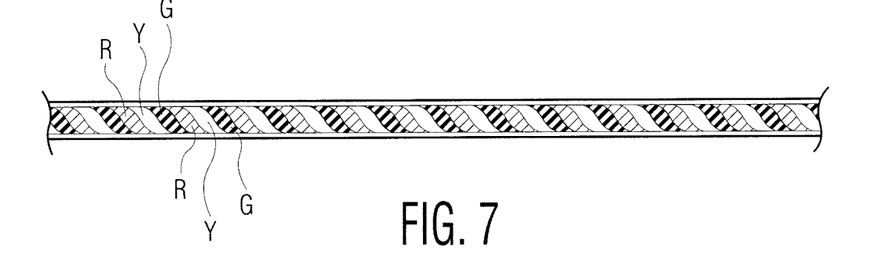
FIG. 7 shows a braided cable arrangement where there are separate LED cable strips or strands, each having a dedicated color light and the three strips are braided or spiraled together and enclosed in a single outer clear cover.
Figure 8:
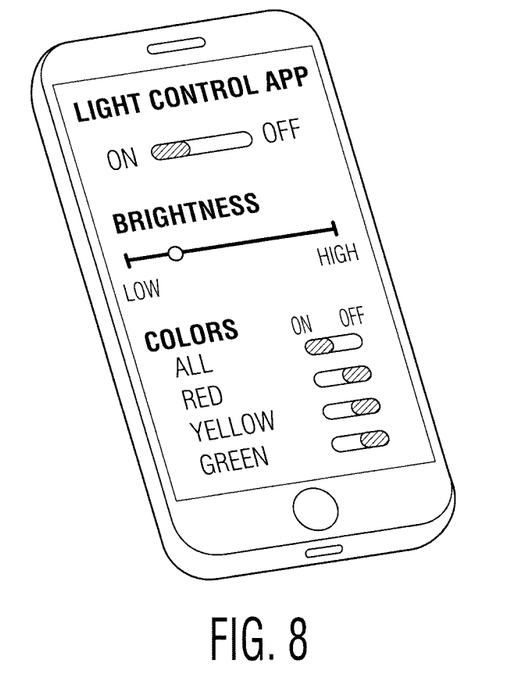
FIG. 8 shows a possible phone app interface to control the lighting parameters.
Figure 9:
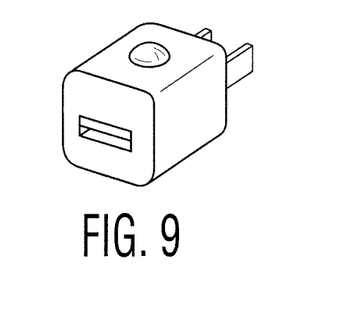
FIG. 9 shows a dedicated power block with a logic controller that may provide a variety of controls, using a single button. These controls may enable toggle lights being turned on and off, control brightness via multiple presses, and/or turn different colors off. The app for the controller may provide options to users to control the light outputs of the different light clusters.

For the purposes of the present invention, it should be understood that the state of charge (SOC) of a battery can be determined using a variety of different methods that are well known in the art. There is the "direct measurement" method, which will not be discussed because it is impractical for the present invention. So is the "specific gravity method" of measuring the SOC of a battery. A very common method of measuring the SOC is by using "voltage based estimation" and these techniques are well known in the art and do not require explication herein. Another method involves "current based SOC estimation" which is also referred to as "Coulomb Counting." Three current sensing methods may be used. These are the direct current method, the method that uses the Hall Effect and the method that uses GMR (magnetoresistive sensors). The SOC of a battery can also be estimated via internal impedance measurements.

Regardless, some of the foregoing methods can be utilized in the present invention to first determine the SOC of the internal battery of a smartphone being charged, for example. In accordance with a method of the invention, the existing system of a smartphone for determining the SOC of the internal battery is employed to provide that SOC information to the controller of the present invention. Software is loaded internally that allows the smartphone to communicate to an external circuit associated with the cable of the present invention that SOC during the charging process. Therefore, the invention does not concentrate on the known technologies for determining the SOC, but only on the novel concept of the present invention which is to communicate to a smartphone user or observer the charge level of the internal battery of the smartphone from afar, allowing the observer to merely glance at the charging cable that is being utilized for this purpose.

Although the present invention has been described in relation to particular embodiments thereof, many other variations and modifications and other uses will become

What is claimed is:

1. An electrical charging cable that is configured to indicate a charge level of a battery being charged, the charging cable comprising:
   a cable body with internal electrical conductors that are configured to carry charging current to the battery being charged; and
   at least one charge indicating light located on an outer surface of the charging cable, the at least one charge indicating light being configured to visually indicate to an observer the charge level of the battery being charged, wherein the at least one light is configured to indicate the charging level by changing the color emitted from the light to indicate different charging levels and is also configured to indicate the different charging levels via a plurality of discrete LED lights arranged linearly along the cable, and
   a logic indicator chip configured to enable a user to selectively set a manner in which the different charging levels are communicated to the user via said at least one charge indicating light;
   an app interface configured to communicate with the logic indicator chip to enable the user to communicate with and instruct the logic indicator chip the user's choice on how the different charging levels should be displayed at the cable.

2. The electrical charging cable of claim 1, wherein the plurality of LED lights are clustered in groups of three or more lights and each LED in each cluster has a distinct color and each color indicates a charge level.

3. The electrical charging cable of claim 2, wherein the colors include yellow, green and red.

4. The electrical charging cable of claim 2, wherein the plurality of LED lights are arranged along a length dimension of the cable body.

5. The electrical charging cable of claim 2, wherein the plurality of LED lights are arranged to spiral around the cable body.

6. The electrical charging cable of claim 2, wherein the plurality of LED lights are configured to indicate the level of charge of the battery by flashing at different rates to indicate the level of charge of the battery.

7. The electrical charging cable of claim 2, wherein the plurality of LED lights are individually capable of displaying multiple colors to indicate charge level.

8. The electrical charging cable of claim 2, wherein said logic indicator chip comprises, as part of the cable, a control circuit which controls the light emanating from the plurality of LED lights, and wherein said logic indicator chip is physically attached to the cable and forms a part thereof.

9. The electrical charging cable of claim 8, wherein the control circuit is powered from an electrical charger that converts AC power to DC power and which also provides power to the control circuit.

10. The electrical charging cable of claim 8, further including the control circuit being operable using a plurality of controls to provide among other functions, the turning on and off functions and brightness control functions.

* * * * *